(12) United States Patent
Shin

(10) Patent No.: US 9,042,503 B2
(45) Date of Patent: May 26, 2015

(54) DATA RECOVERY CIRCUIT AND OPERATION METHOD THEREOF

(71) Applicant: Samsung Electronics Co., Ltd., Suwon-si (KR)

(72) Inventor: Jong Shin Shin, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 80 days.

(21) Appl. No.: 13/718,403

(22) Filed: Dec. 18, 2012

(65) Prior Publication Data

US 2013/0259177 A1    Oct. 3, 2013

(30) Foreign Application Priority Data

Apr. 2, 2012    (KR) .................. 10-2012-0033742

(51) Int. Cl.
*H04L 7/00*    (2006.01)
*H04L 7/04*    (2006.01)

(52) U.S. Cl.
CPC .............. *H04L 7/0016* (2013.01); *H04L 7/048* (2013.01)

(58) Field of Classification Search
None
See application file for complete search history.

(56) References Cited

U.S. PATENT DOCUMENTS

| 6,211,741 | B1 | 4/2001 | Dalmia |
| 6,959,058 | B2 | 10/2005 | Yoo et al. |
| 7,436,904 | B2* | 10/2008 | Kwak ............................ 375/316 |
| 7,522,687 | B2 | 4/2009 | Cranford, Jr. et al. |
| 2009/0257537 | A1 | 10/2009 | Kim et al. |
| 2009/0274455 | A1* | 11/2009 | Dvir et al. ........................ 398/20 |
| 2010/0148832 | A1 | 6/2010 | Oshima |

FOREIGN PATENT DOCUMENTS

| JP | 2004242243 | 8/2004 |
| KR | 20050011760 | 1/2005 |
| KR | 1020060059530 | 2/2006 |
| KR | 20100005948 | 1/2010 |

\* cited by examiner

*Primary Examiner* — Adolf Dsouza
(74) *Attorney, Agent, or Firm* — Onello & Mello, LLP.

(57) ABSTRACT

In a data recovery circuit, a sampling circuit is configured to sample data using a plurality of sampling clock signals having different phases relative to one another and to output a plurality of sampled data. A recovery data generation circuit is configured to perform a logic operation on the plurality of sampled data and to generate a plurality of intermediate recovery data according to a result of the logic operation. A recovery circuit is configured to check the plurality of intermediate recovery data for existence of an error and to output intermediate recovery data that is error-free, among the plurality of intermediate recovery data, as recovery data.

18 Claims, 10 Drawing Sheets

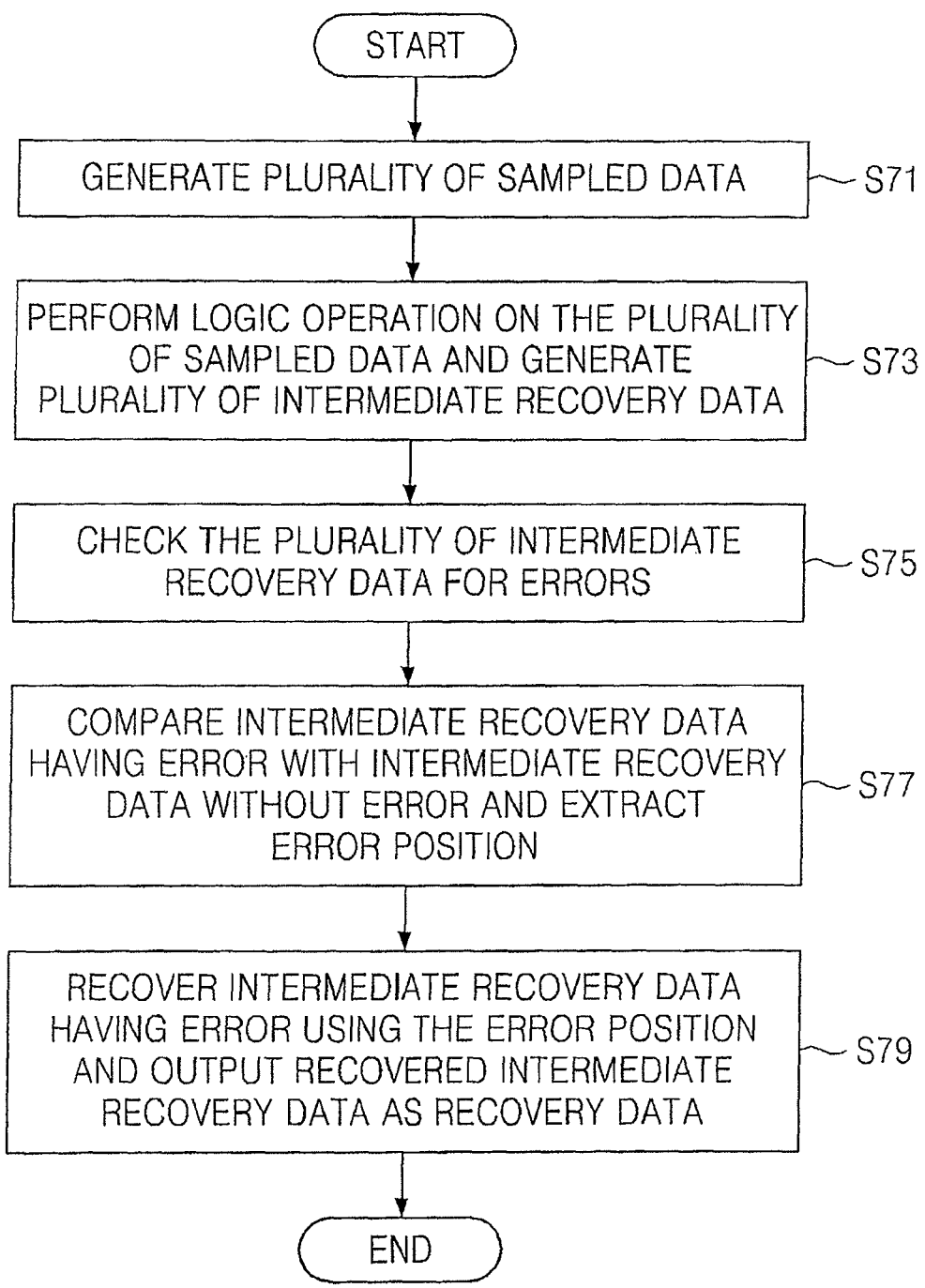

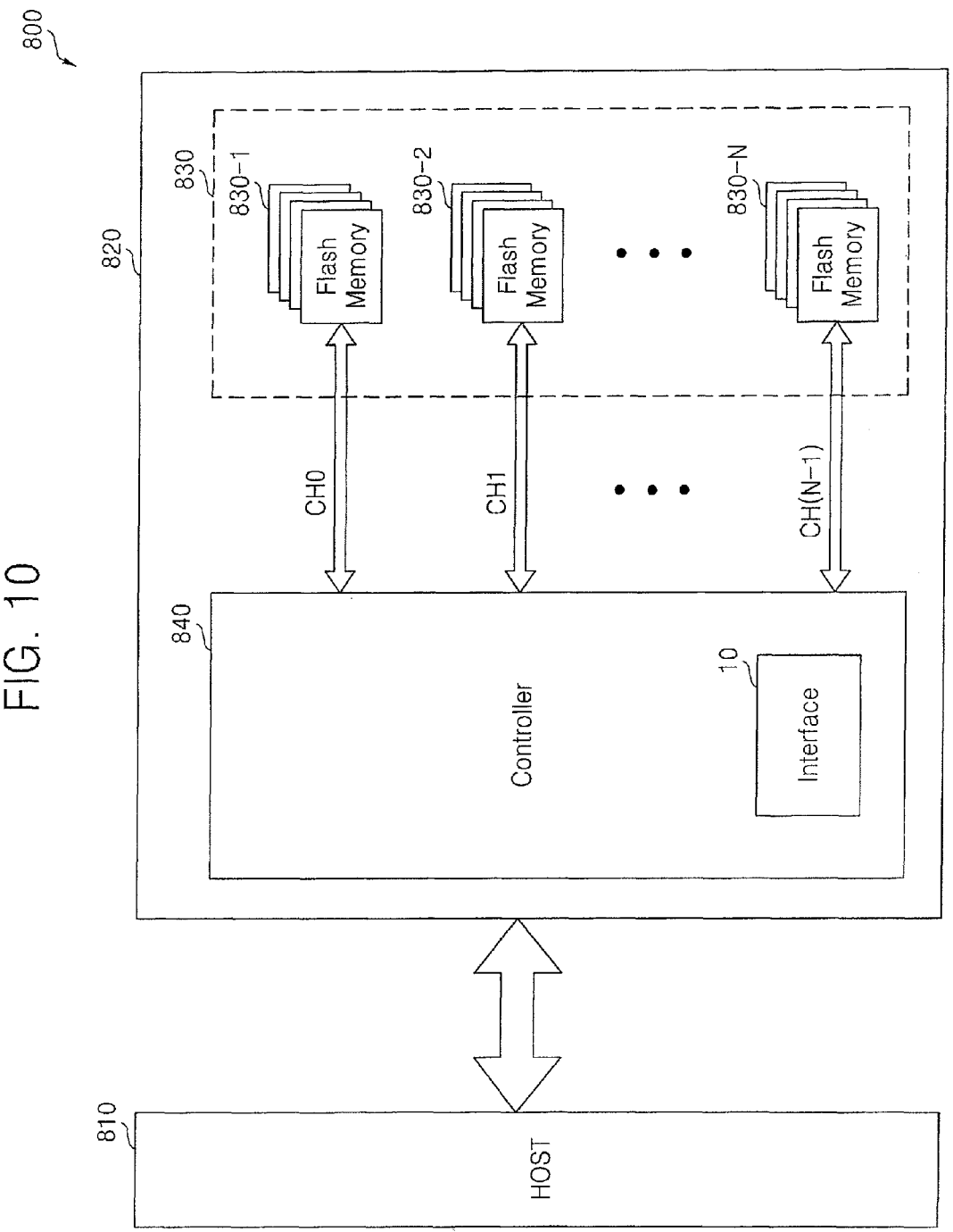

DATA RECOVERY CIRCUIT AND OPERATION METHOD THEREOF

CROSS-REFERENCE TO RELATED APPLICATIONS

This application claims priority under 35 U.S.C. §119(a) from Korean Patent Application No. 10-2012-0033742 filed on Apr. 2, 2012, the disclosure of which is hereby incorporated by reference in its entirety.

BACKGROUND

Embodiments of the inventive concepts relate to data recovery, and more particularly, to a data recovery circuit for outputting error-free intermediate recovery data among a plurality of intermediate recovery data as recovery data, and to an operation method thereof.

With continuing development of technology, data transmission rate is now achievable at several tens of gigabits per second up to several hundreds of gigabits per second. In general, parallel interfaces or serial interfaces are employed in such ultra high-speed communication.

Since parameters such as maximum transmission distance and maximum transmission speed are limited due to crosstalk and/or noise coupling between bits of data transmitted via a parallel interface, a serial interface is commonly employed as an interface for the transmission of high-speed data.

The serial interface converts parallel data into serial data prior to transmission. Unlike the parallel interface that simultaneously transmits a clock signal and data through different transmission lines, a serial interface transmits data including information pertaining to the clock signal through a single transmission line. In the parallel interface, when the clock signal and data are simultaneously transmitted to a receiving terminal, skew may occur between the clock signal and the data at the receiving terminal since the unit interval of the data is usually relatively quite short, on the order of 1 ns or less, in ultra high-speed communication, while the transmission distance can be relatively long, For this reason, in such high-speed applications, a transmitting terminal is required to transmit data including information pertaining to a clock signal to a receiving terminal, where the receiving terminal extracts or recovers the clock signal and data from the received data. The serial interface extracts or recovers the clock signal and data from data including information about the clock signal using circuit referred to as a clock and data recovery circuit.

SUMMARY

According to some embodiments of the inventive concept, there is provided a data recovery circuit comprising: a sampling circuit configured to sample data using a plurality of sampling clock signals having different phases relative to one another and to output a plurality of sampled data; a recovery data generation circuit configured to perform a logic operation on the plurality of sampled data and to generate a plurality of intermediate recovery data according to a result of the logic operation; and a recovery circuit configured to check the plurality of intermediate recovery data for existence of an error and to output intermediate recovery data that is error-free, among the plurality of intermediate recovery data, as recovery data.

In some embodiments, the recovery data generation circuit includes: a logic gate circuit configured to determine whether logic levels of the plurality of sampled data are the same and to output a decision signal according to a result of the determination; and a data generation circuit configured to generate the plurality of intermediate recovery data, the plurality of intermediate recovery data respectively having the same or different logic levels based on a logic level of one of the plurality of sampled data in response to the decision signal.

In some embodiments, the logic gate circuit outputs the decision signal having a first level when the logic levels of the plurality of sampled data are all the same, and wherein the data generation circuit generates the plurality of intermediate recovery data having the same logic levels in response to the decision signal having the first level.

In some embodiments, the logic gate circuit outputs the decision signal having a second level when the logic levels of the plurality of sampled data are not all the same, and wherein the data generation circuit generates the plurality of intermediate recovery data having the different logic levels in response to the decision signal having the second level.

In some embodiments, the logic gate circuit includes: a plurality of XOR gates each configured to receive at least two sampled data among the plurality of sampled data; and an OR gate configured to perform an OR operation on output signals of the respective XOR gates and to output the decision signal.

In some embodiments, the recovery circuit includes: a plurality of cyclic redundancy check (CRC) checkers each configured to perform CRC in order to check each of the plurality of intermediate recovery data for existence of an error and to output a detection signal indicating existence or non-existence of an error; a plurality of frame buffers configured to respectively store each of the plurality of intermediate recovery data; a selection signal generator configured to output a selection signal in response to the detection signal output from each of the CRC checkers; and a multiplexer configured to output data from one of the frame buffers as the recovery data in response to the selection signal.

In some embodiments, the recovery circuit includes: a plurality of cyclic redundancy check (CRC) check units each configured to perform CRC in order to check each of the plurality of intermediate recovery data for existence of an error; an extraction unit configured to compare first intermediate recovery data, which is output from one of the CRC check units and in which an error is present, with second intermediate recovery data, which is output from another one of the CRC check units and in which an error is not present, to extract an error position, and to output the first intermediate recovery data and the error position; and an error correction unit configured to correct an error in the first intermediate recovery data based on the error position and to output the recovery data.

In some embodiments, the sampling circuit and the recovery data generation circuit are implemented in a physical layer and the recovery circuit is implemented in a link layer.

According to some embodiments of the inventive concept, there is provided an operation method of a data recovery circuit, the operation method comprising: sampling data using a plurality of sampling clock signals having different phases relative to one another and outputting a plurality of sampled data; performing an XOR operation on the plurality of sampled data and generating a plurality of intermediate recovery data according to a result of the XOR operation; and checking the plurality of intermediate recovery data for an error and outputting intermediate recovery data that is error-free among the plurality of intermediate recovery data as recovery data.

In some embodiments, the generating the plurality of intermediate recovery data comprises: generating the plurality of intermediate recovery data having same logic levels when logic levels of the plurality of sampled data are the same; and generating the plurality of intermediate recovery data having different logic levels relative to each another when the logic levels of the plurality of sampled data are not the same.

In some embodiments, the outputting the intermediate recovery data as the recovery data comprises: performing cyclic redundancy check (CRC) to check each of the plurality of intermediate recovery data for existence of an error and outputting a detection signal indicating existence or non-existence of an error; and outputting data from one of frame buffers, which respectively store each of the plurality of intermediate recovery data, as the recovery data in response to the detection signals.

In some embodiments, the outputting the intermediate recovery data as the recovery data comprises: performing cyclic redundancy check (CRC) to check each of the plurality of intermediate recovery data for existence of an error using a plurality of CRC check units; comparing first intermediate recovery data, which is output from one of the CRC check units and in which an error is present, with second intermediate recovery data, which is output from another one of the CRC check units and in which an error is not present, extracting an error position, and outputting the first intermediate recovery data and the error position; and correcting an error in the first intermediate recovery data based on the error position and outputting the recovery data.

In some embodiments, the operation method is performed in a system comprising a serial advanced technology attachment (SATA) interface.

In some embodiments, the operation method is performed in a system using a peripheral component interconnect express (PCIe) standard.

According to some embodiments of the inventive concept, there is provided a data recovery circuit comprising: a sampling circuit that samples input data with a plurality of sampling clock signals, the sampling clock signals having different phases relative to each other, the sampling circuit outputting a plurality of sampled data; a recovery data generation circuit that receives the plurality of sampled data and that generates first and second intermediate recovery data, the first and second intermediate recovery data having the same logic level when the plurality of sampled data all have the same logic levels, and the first and second intermediate recovery data having different logic levels when the plurality of sampled data do not all have the same logic levels; and a recovery circuit that generates recovery data that is error-free in response to the first and second intermediate recovery data.

In some embodiments, the recovery data generation circuit includes an XOR logic operation circuit that performs on XOR operation on the plurality of sampled data to determine whether the plurality of sampled data all have the same logic levels.

In some embodiments, the recovery circuit includes: first and second cyclic redundancy check (CRC) checkers, each configured to perform CRC in order to check each of the corresponding first and second intermediate recovery data for existence of an error and to output a detection signal indicating existence or non-existence of an error; first and second frame buffers configured to respectively store each of the first and second intermediate recovery data; a selection signal generator configured to output a selection signal in response to the detection signal output from each of the first and second CRC checkers; and a multiplexer configured to output data from one of the first and second frame buffers as the recovery data in response to the selection signal.

In some embodiments, the recovery circuit includes: first and second cyclic redundancy check (CRC) check units, each configured to perform CRC in order to check each of the corresponding first and second intermediate recovery data for existence of an error; an extraction unit configured to compare first intermediate recovery data, which is output from the first CRC check unit and in which an error is present, with second intermediate recovery data, which is output from the second CRC check unit and in which an error is not present, to extract an error position in the first and second intermediate recovery data for existence of an error, and to output the first intermediate recovery data and the error position; and an error correction unit configured to correct an error in the first intermediate recovery data based on the error position and to output the recovery data.

In some embodiments, the recovery circuit compares a logic level of the first and second intermediate recovery data, and generates the recovery data in response to the comparison.

In some embodiments, the recovery circuit further determines an error position in the first and second intermediate recovery data, and generates the recovery data in response to the error position.

BRIEF DESCRIPTION OF THE DRAWINGS

The above and other features and advantages of the inventive concepts will become more apparent by describing in detail exemplary embodiments thereof with reference to the attached drawings in which:

FIG. 9 is a flow diagram of a data recovery method performed in an interface according to other example embodiments of the inventive concept; and FIG. 10 is a schematic block diagram of a semiconductor system including the interface illustrated in FIG. 1, in accordance with embodiments of the inventive concepts.

DETAILED DESCRIPTION OF THE EMBODIMENTS

Figure 1:
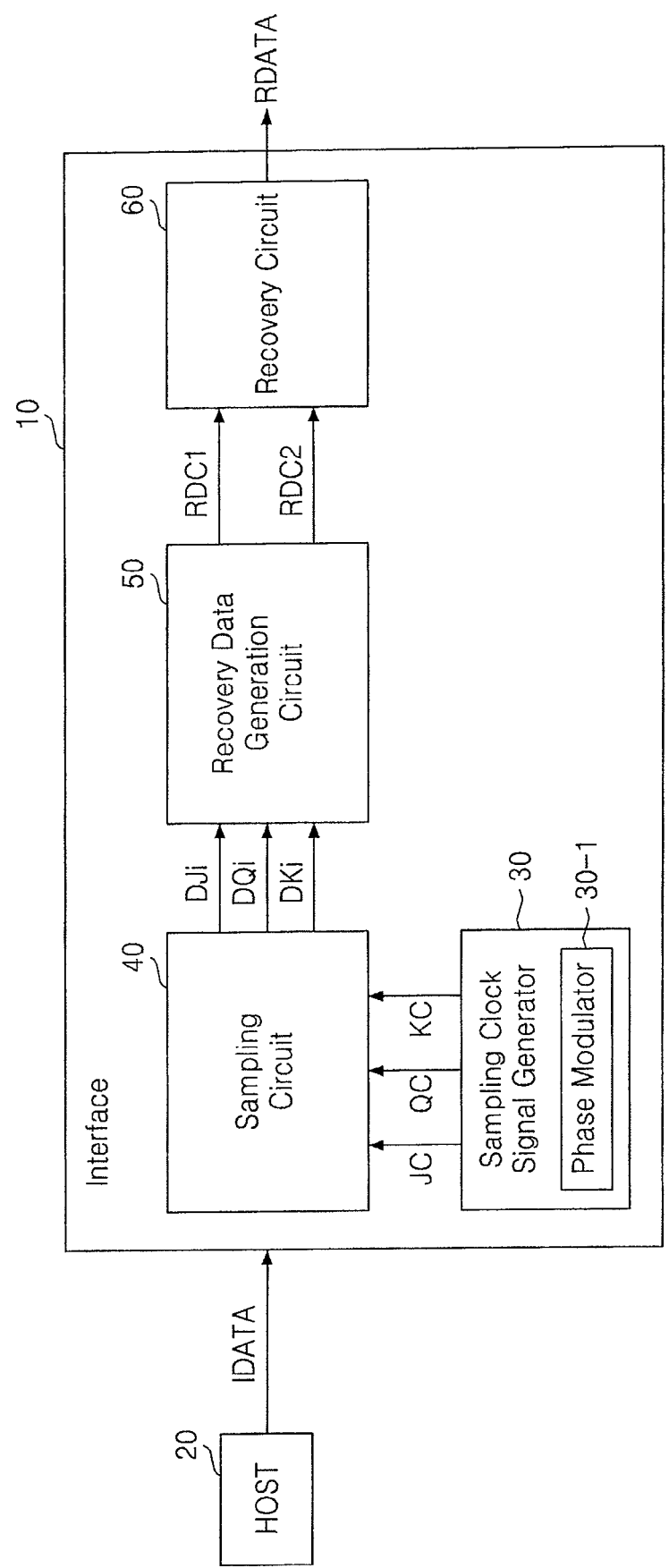
FIG. 1 is a block diagram of an interface according to some embodiments of the inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein;

rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of an interface according to some embodiments of the inventive concepts. For sake of convenience in the description, a host 20 is illustrated together with the interface 10. The interface 10 functions as a data recovery circuit.

A system including the interface 10 and the host 20 may comprise a system including a serial advanced technology attachment (SATA) interface or a system using the peripheral component interconnect express (PCIe) standard. The system including the interface 10 and the host 20 may further comprise a personal computer, a laptop computer, or a portable device, or other electronic device having high-speed data communication capability.

Referring to FIG. 1, the interface 10 processes data IDATA received from the host 20, which received data IDATA may include errors, and generates recovery data RDATA absent of errors. In some embodiments, the interface 10 includes a sampling clock signal generator 30, a sampling circuit 40, a recovery data generation circuit 50, and a recovery circuit 60.

Figure 3:
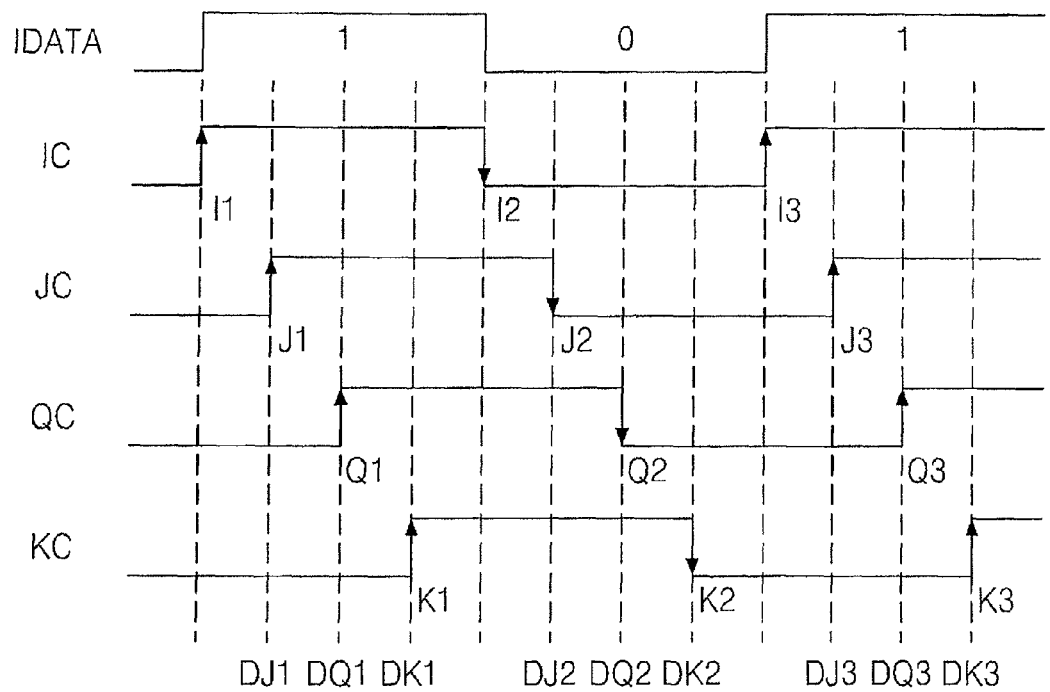
FIG. 3 is a diagram for illustrating a process for generating intermediate recovery data when the received data is error-free.
Figure 4:
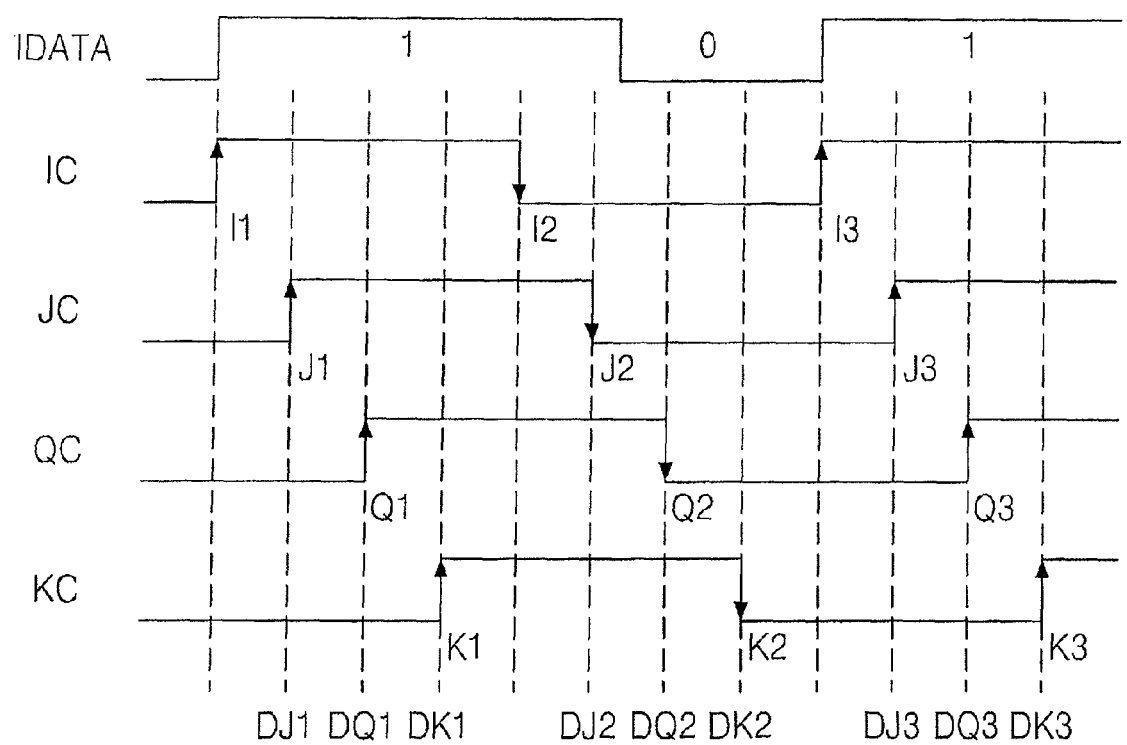
FIG. 4 is a diagram for illustrating a process for generating intermediate recovery data when one or more errors are present in the received data.

In some embodiments, the sampling clock signal generator 30 may generate a plurality of sampling clock signals JC, QC, and KC having phases that are different relative to one another, as shown in the timing diagrams of FIGS. 3 and 4.

In some embodiments, the sampling clock signal generator 30 may also generate a reference clock signal IC, as shown in FIG. 3, which is reference signal from which the sampling clock signals JC, QC, and KC are generated. The reference clock signal IC shown in the timing diagram of FIG. 3 may be set to have a rising or falling edge Ii (where "i" is a natural number, e.g., i=1, 2, 3) that coincides with a rising or falling edge of the received data IDATA.

In some embodiments, signals used for sampling in the sampling circuit 40 are the sampling clock signals JC, QC, and KC. Thus, for sake of convenience in the description, the reference clock signal IC is not shown in FIG. 1.

In some embodiments, the sampling clock signal generator 30 may include a phase modulator 30-1. The sampling clock signal generator 30 may generate the sampling clock signals JC, QC, and KC having different phases relative to one another using the phase modulator 30-1. In some embodiments, the timing of the rising edges and/or falling edges of the sampling clock signals JC, QC, and KC may be controlled in response to an external control signal.

The sampling circuit 40 samples the data IDATA received from the host 20 using a plurality of sampling clock signals, e.g., the sampling clock signals JC, QC, and KC, having the different respective phases and generates a plurality of sampled data, e.g., first sampled data DJi, second sampled data DQi, and third sampled data DKi.

In some embodiments, the recovery data generation circuit 50 generates a plurality of intermediate recovery data, e.g., first intermediate recovery data RDC1 and second intermediate recovery data RDC2, based on the sampled data DJi, DQi, and DKi received from the sampling circuit 40.

In some embodiments, the recovery circuit 60 checks the first intermediate recovery data RDC1 and the second intermediate recovery data RDC2 for the presence of errors and outputs the intermediate recovery data RDC1 or RDC2 in an error-free condition as the recovery data RDATA.

Embodiments of the recovery data generation circuit 50 and the recovery circuit 60 will now be described in detail with reference to FIGS. 2 through 6.

Figure 2:
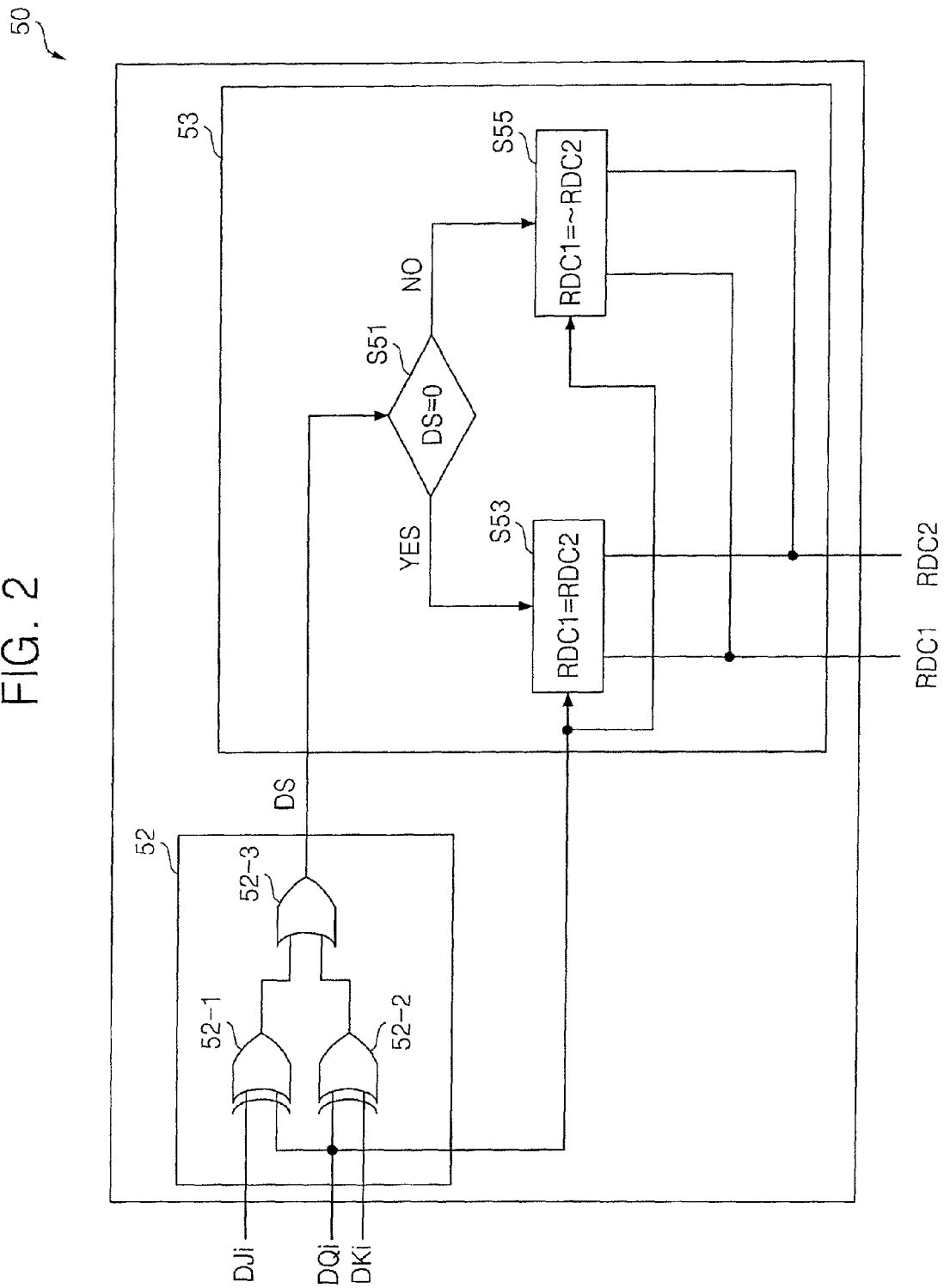
FIG. 2 is a circuit diagram of a logic gate circuit and a data generation circuit, which are included in a recovery data generation circuit illustrated in FIG. 1.

FIG. 2 is a circuit diagram of embodiments of a logic gate circuit 52 and a data generation circuit 53, which are included in the recovery data generation circuit 50 illustrated in FIG. 1. FIG. 3 is a diagram for illustrating a process for generating the intermediate recovery data RDC1 and RDC2 when the data IDATA is error-free. FIG. 4 is a diagram for illustrating a process for generating the intermediate recovery data RDC1 and RDC2 when one or more errors are present in the received data IDATA.

Referring to FIGS. 1 through 4, the sampling circuit 40 may sample the received data IDATA in response to the rising and falling edges Ji, Qi, and Ki (where "i" is a natural number, e.g., i=1, 2, 3) of the sampling clock signals JC, QC, and KC. The sampling circuit 40 further outputs the sampled data DJi, DQi, and DKi.

In some embodiments, the recovery data generation circuit 50 performs a logic operation, e.g., an XOR operation, on the sampled data DJi, DQi, and DKi and generates a plurality of intermediate recovery data, e.g., the first and second intermediate recovery data RDC1 and RDC2, in accordance with a result of the logic operation.

The recovery data generation circuit 50 includes the logic gate circuit 52 and the data generation circuit 53.

In the embodiment of FIG. 2, the logic gate circuit 52 includes a first XOR gate 52-1, a second XOR gate 52-2, and an OR gate 52-3. Other logic configurations suitable for attaining the desired logic result are equally applicable to the embodiments of the present inventive concepts.

The first XOR gate 52-1 performs an XOR operation on the first sampled data DJi and the second sampled data DQi. The second XOR gate 52-2 performs an XOR operation on the second sampled data DQi and the third sampled data DKi. The OR gate 52-3 performs an OR operation on an output signal of the first XOR gate 52-1 and an output signal of the second XOR gate 52-2.

When the logic levels of the sampled data DJi, DQi, and DKi are all the same, the logic gate circuit 52 outputs a first level, e.g., data of "0", as a decision signal DS. At this time, in response to the decision signal DS indicating the data of "0" in operation S51, the data generation circuit 53 outputs the first intermediate recovery data RDC1 and the second intermediate recovery data RDC2, which have the same logic level, in operation S53 of FIG. 3. In this case, the first and second intermediate recovery data RDC1 and RDC2 may be generated to have the same logic level as the second sampled data DQi.

When the logic levels of all the sampled data DJi, DQi, and DKi are not the same, the logic gate circuit 52 outputs a second level, e.g., data of "1", as the decision signal DS. At this time, in response to the decision signal DS indicating the data of "1" in operation S51, the data generation circuit 53 outputs the first intermediate recovery data RDC1 and the second intermediate recovery data RDC2, which have different logic levels relative to each other, in operation S55 of FIG. 3. In the present example embodiment, as a result, the first intermediate recovery data RDC1 may be generated to have the same logic level as the second sampled data DQi and the second intermediate recovery data RDC2 may be generated to have a different logic level than the second sampled data DQi.

In the present embodiment, when the first and second intermediate recovery data RDC1 and RDC2 are have different logic levels relative to each other, this is used to indicate that the received data is a candidate for the generation of recovery data RDATA. In some embodiments, the detection of whether intermediate recovery data RDC1, RDC2 has, or does not have, errors present, can be performed by the recovery circuit 60.

To further explain the procedure for generating the intermediate recovery data RDC1 and RDC2, data included in the received data IDATA, e.g., a serial data stream, is assumed to be "101" in the example of FIGS. 3 and 4.

Referring to FIG. 3, the received data IDATA may be a serial data stream that does not exhibit an error, where such an error can include for example, a jitter error.

The logic level of each of the sampled data DJ1, DQ1, and DK1 at the first edge J1, Q1, or K1 of each of the sampling clock signals JC, QC, and KC is "1". In this case, since the logic levels of the sampled data DJ1, DQ1, and DK1 are the same, the logic gate circuit 52 may output data of "0" as the decision signal DS.

The data generation circuit 53 outputs the first and second intermediate recovery data RDC1 and RDC2 having the same logic level in response to the decision signal DS indicating the data of "0" in operation S53. In this example embodiment, the first and second intermediate recovery data RDC1 and RDC2 may be generated to have the same logic level of "1" as the second sampled data DQ1.

The logic level of each of the sampled data DJ2, DQ2, and DK2 at the second edge J2, Q2, or K2 of each of the sampling clock signals JC, QC, and KC is "0". In this case, since the logic levels of the sampled data DJ2, DQ2, and DK2 are the same, the logic gate circuit 52 may output data of "0" as the decision signal DS.

The data generation circuit 53 outputs the first and second intermediate recovery data RDC1 and RDC2 having the same logic level in response to the decision signal DS indicating the data of "0" in operation S53. In this example embodiment, the first and second intermediate recovery data RDC1 and RDC2 may have the same logic level of "0" as the second sampled data DQ2.

The logic level of each of the sampled data DJ3, DQ3, and DK3 at the third edge J3, Q3, or K3 of each of the sampling clock signals JC, QC, and KC is "1". In this case, since the logic levels of the sampled data DJ3, DQ3, and DK3 are the same, the logic gate circuit 52 may output data of "0" as the decision signal DS.

The data generation circuit 53 outputs the first and second intermediate recovery data RDC1 and RDC2 having the same logic level in response to the decision signal DS indicating the data of "0" in operation S53. In this example embodiment, the first and second intermediate recovery data RDC1 and RDC2 may have the same logic level of "1" as the second sampled data DQ3.

In other words, in the case illustrated in FIG. 3, a stream of the first intermediate recovery data RDC1 and a stream of the second intermediate recovery data RDC2 are the same as "101", which may indicate that the received data IDATA does not have an error.

Referring to FIG. 4, in this example, the received data IDATA reflects a serial data stream in which an error is present. In the present example embodiment, a jitter-type error is present in the received data. The present inventive concepts, however, are equally applicable to data recovery based on other types of error.

The logic level of each of the sampled data DJ1, DQ1, and DK1 at the first edge J1, Q1, or K1 of each of the sampling clock signals JC, QC, and KC is "1". In this case, since the logic levels of the sampled data DJ1, DQ1, and DK1 are the same, the logic gate circuit 52 may output data of "0" as the decision signal DS.

The data generation circuit 53 outputs the first and second intermediate recovery data RDC1 and RDC2 having the same logic level in response to the decision signal DS indicating the data of "0" in operation S53. In this example embodiment, the first and second intermediate recovery data RDC1 and RDC2 may have the same logic level of "1" as the second sampled data DQ1.

The logic level of the first sampled data DJ2 at the second edge J2 of the first sampling clock signal JC is "1". The logic level of the second sampled data DQ2 at the second edge Q2 of the second sampling clock signal QC is "0". The logic level of the third sampled data DK2 at the second edge K2 of the third sampling clock signal KC is "0". In this case, since there is the sampled data DJ2 having a logic level that is different than the logic levels of the other sampled data DQ2 and DK2, the logic gate circuit 52 may output data of "1" as the decision signal DS.

The data generation circuit 53 outputs the first and second intermediate recovery data RDC1 and RDC2 having different logic levels with respect to each other in response to the decision signal DS indicating the data of "1" in operation S55. In this example embodiment, the first intermediate recovery data RDC1 is made to have the same logic level of "0" as the second sampled data DQ2 and the second intermediate recovery data RDC2 is made to have a logic level of "1", or different from the logic level of the second sampled data DQ2.

The logic levels of each of the sampled data DJ3, DQ3, and DK3 at the third edge J3, Q3, or K3 of each of the sampling clock signals JC, QC, and KC is "1". In this case, since the logic levels of the sampled data DJ3, DQ3, and DK3 are the same, the logic gate circuit 52 may output data of "0" as the decision signal DS.

The data generation circuit 53 outputs the first and second intermediate recovery data RDC1 and RDC2 having the same logic level in response to the decision signal DS indicating the data of "0" in operation S53. In this example embodiment, the first and second intermediate recovery data RDC1 and RDC2 may have the same logic level of "1" as the second sampled data DQ3.

In the case illustrated in FIG. 4, the resulting stream, or data sequence, of the first intermediate recovery data RDC1 is "101", while the stream, or data sequence, of the second intermediate recovery data RDC2 is "111". Accordingly, in some embodiments, when the stream of the first intermediate recovery data RDC1 is different from the stream of the second intermediate recovery data RDC2, for example, when the data IDATA is like as shown in FIG. 4, it may indicate that the received data IDATA has an error. In other embodiments, when an individual data element of the first intermediate recovery data RDC1 is different from a corresponding position of an individual data element of the second intermediate recovery data RDC2, as in the present example, the second data elements of the RDC1 "0" and RDC2 "1" are different, this can be used to indicate that the received data IDATA has an error.

Figure 5:
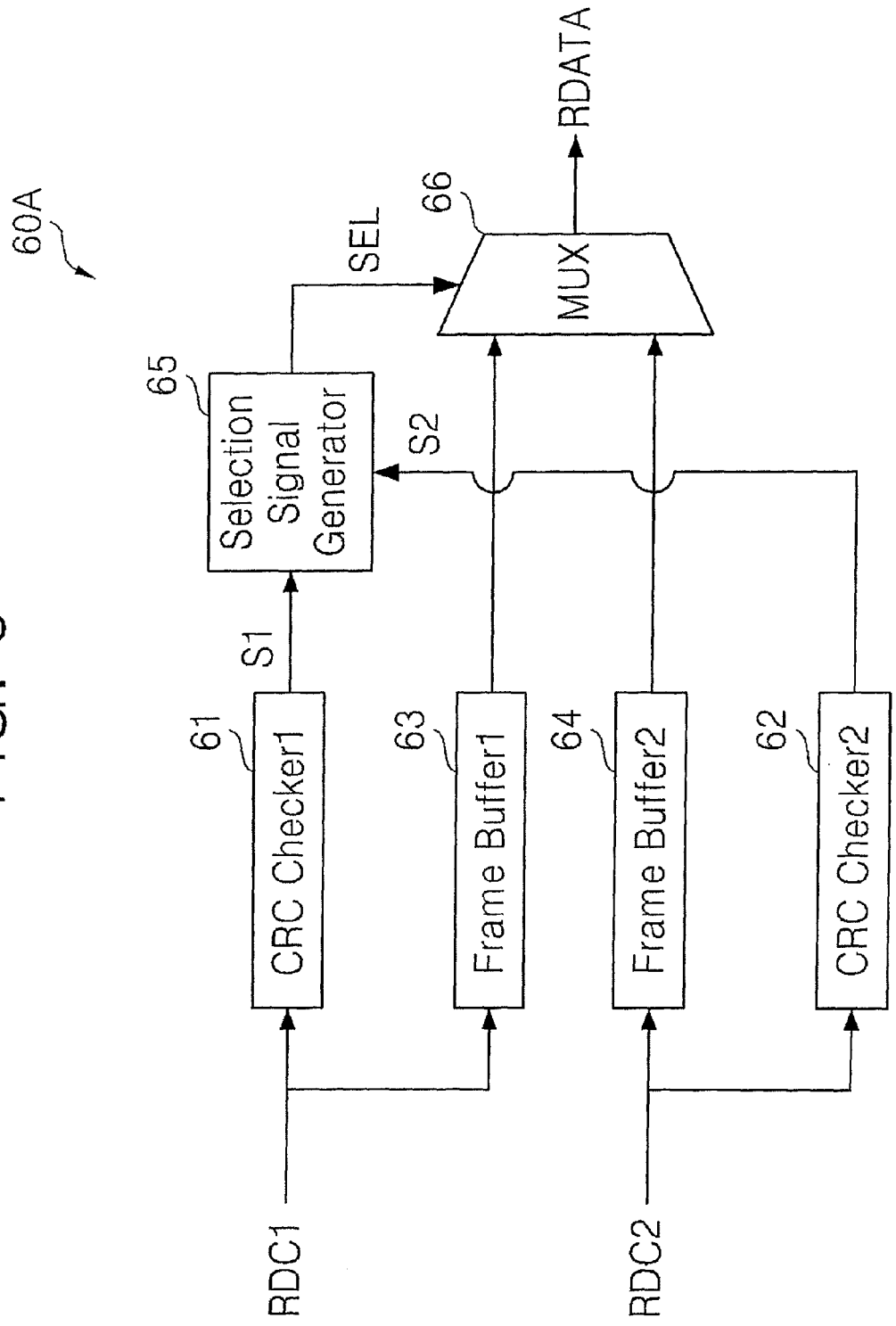
FIG. 5 is a block diagram of an example embodiment of a recovery circuit illustrated in FIG. 1.

FIG. 5 is a block diagram of an example embodiment of the recovery circuit 60 illustrated in FIG. 1. Referring to FIG. 5, a recovery circuit 60A as an example of the recovery circuit 60, in this embodiment, includes a first cyclic redundancy check (CRC) checker 61, a second CRC checker 62, a first frame buffer 63, a second frame buffer 64, a selection signal generator 65, and a multiplexer (MUX) 66.

The CRC used in the embodiments of the inventive concept is merely an example of an error checking device or method. The inventive concept is not restricted to these embodiments. In other embodiments, a method of checking encoding errors according to the 8B/10B encoding protocol or a method of checking errors of running disparity in an 8B/10B-encoded signal may be employed. In other embodiments, other suitable methods and devices for checking errors may be employed.

In the present example embodiment, the first intermediate recovery data RDC1 output from the recovery data generation circuit 50 is stored in the first frame buffer 63. Likewise, the second intermediate recovery data RDC2 output from the recovery data generation circuit 50 is stored in the second frame buffer 64.

The first CRC checker 61 performs a CRC operation on the first intermediate recovery data RDC1, detects the existence or non-existence of an error, and outputs a first detection signal S1 as a result of the detection. The second CRC checker 62 performs CRC on the second intermediate recovery data RDC2, detects the existence or non-existence of an error, and outputs a second detection signal S2 as a result of the detection.

The selection signal generator 65 outputs a selection signal SEL in response to the first and second detection signals S1 and S2. For instance, when the first detection signal S1 indicates that an error exists in the first intermediate recovery data RDC1 and the second detection signal S2 indicates that an error does not exist in the second intermediate recovery data RDC2, the selection signal generator 65 generates the selection signal SEL having a first logic level. Accordingly, in response, the MUX 66 outputs an output signal of the second frame buffer 64, e.g., the second intermediate recovery data RDC2, as the recovery data RDATA in response to the selection signal SEL.

When the first detection signal S1 indicates that an error does not exist in the first intermediate recovery data RDC1 and the second detection signal S2 indicates that an error exists in the second intermediate recovery data RDC2, the selection signal generator 65 generates the selection signal SEL having a second logic level. Accordingly, the MUX 66 outputs an output signal of the first frame buffer 63, e.g., the first intermediate recovery data RDC1, as the recovery data RDATA in response to the selection signal SEL.

When the first detection signal S1 indicates that an error does not exist in the first intermediate recovery data RDC1 and the second detection signal S2 indicates that an error does not exist in the second intermediate recovery data RDC2, the selection signal generator 65 outputs the selection signal SEL having either of the first and second logic levels to the MUX 66.

Figure 6:
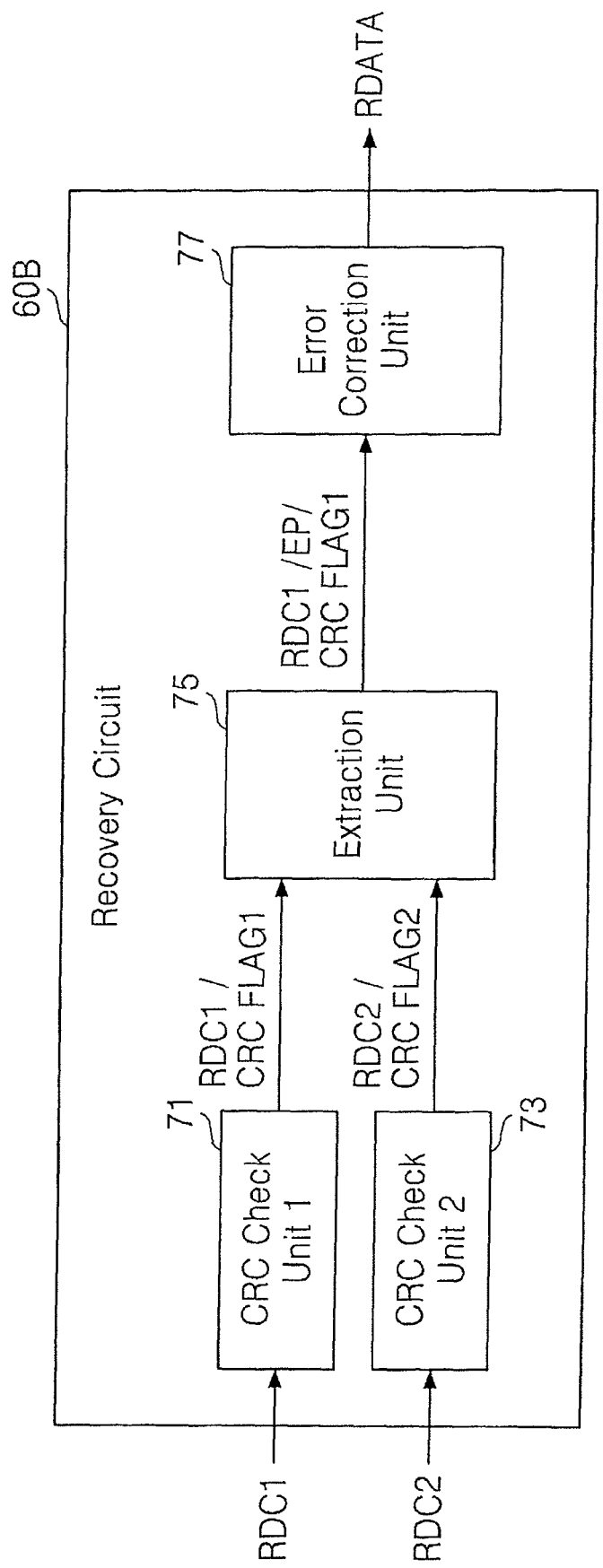
FIG. 6 is a block diagram of another example embodiment of the recovery circuit illustrated in FIG. 1.

FIG. 6 is a block diagram of another example of the recovery circuit 60 illustrated in FIG. 1. Referring to FIGS. 4 and 6, a recovery circuit 60B as an example of the recovery circuit 60 includes a first CRC check unit 71, a second CRC check unit 73, and an extraction unit 75. In some embodiments, the recovery circuit 60B may also further include an error correction unit 77. As an example of the operation of the recovery circuit 60B, the case shown in FIG. 4 in which the received data IDATA has an error, e.g., a jitter error, will be described.

The first CRC check unit 71 performs a CRC operation on the first intermediate recovery data RDC1 and transmits a first CRC flag CRCFLAG1 generated as a result of the CRC and the first intermediate recovery data RDC1 to the extraction unit 75. Likewise, the second CRC check unit 73 performs CRC on the second intermediate recovery data RDC2 and transmits a second CRC flag CRCFLAG2 generated as a result of the CRC and the second intermediate recovery data RDC2 to the extraction unit 75.

The extraction unit 75 may compare the first intermediate recovery data RDC1 (=101) with the second intermediate recovery data RDC2 (=111) and extract a position EP of an error in the first intermediate recovery data RDC1 according to a result of the comparison. The error position EP may be a position of a bit at which the first intermediate recovery data RDC1 (=101) is different from the second intermediate recovery data RDC2 (=111).

The extraction unit 75 may transmit the first intermediate recovery data RDC1 (=101), the error position EP, and/or the first CRC flag CRCFLAG1 to the error correction unit 77. When the recovery circuit 60B does not include the error correction unit 77, the extraction unit 75 may transmit the first intermediate recovery data RDC1 (=101), the error position EP, and/or the first CRC flag CRCFLAG1 to an upper layer 705 shown in FIG. 8.

The error correction unit 77 may correct, for example, invert, a bit having an error in the first intermediate recovery data RDC1 based on the error position EP and/or the first CRC flag CRCFLAG1. The error correction unit 77 may transmit the error-corrected recovery data RDATA to the upper layer 705 shown in FIG. 8.

Figure 7:
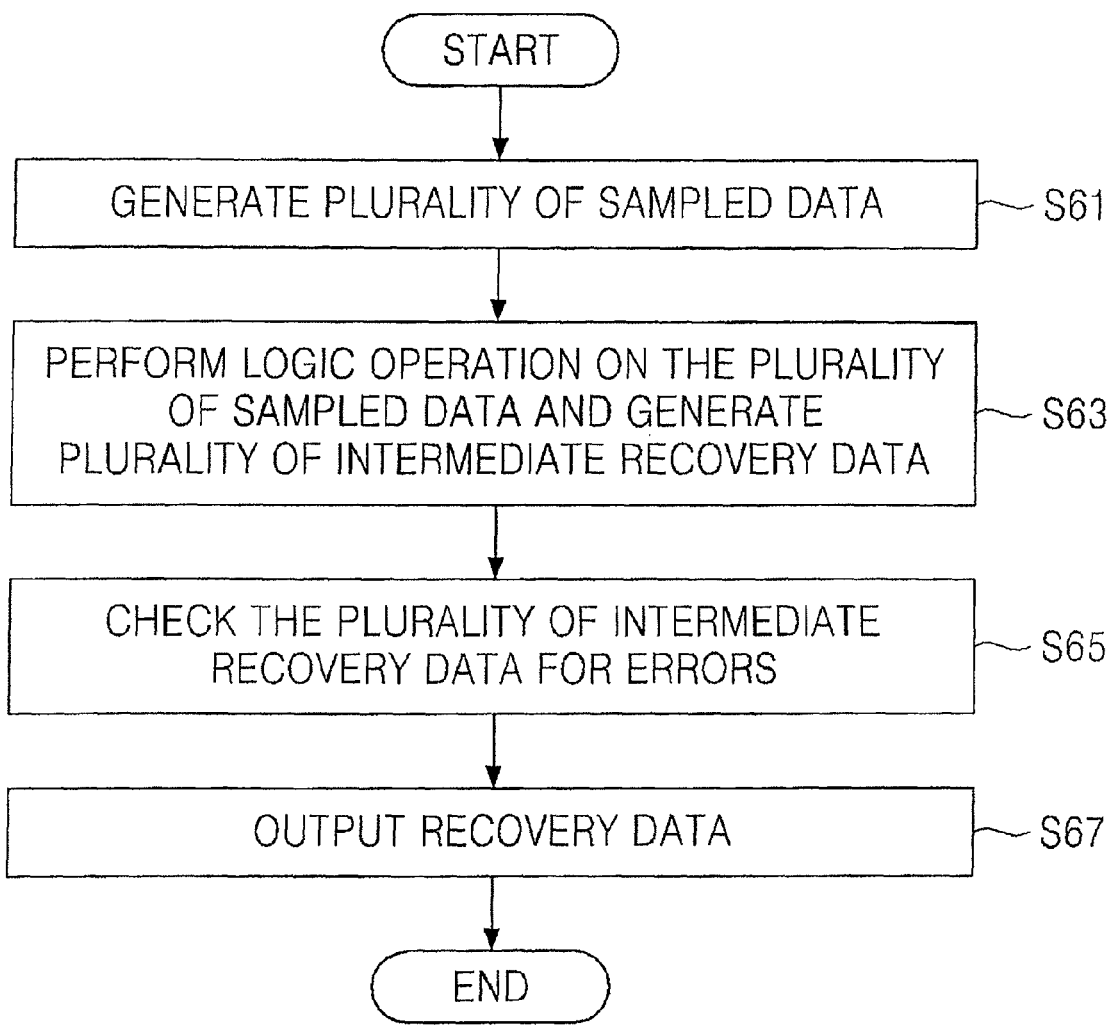
FIG. 7 is a flow diagram of a data recovery method performed in an interface according to some embodiments of the inventive concepts.
Figure 8:
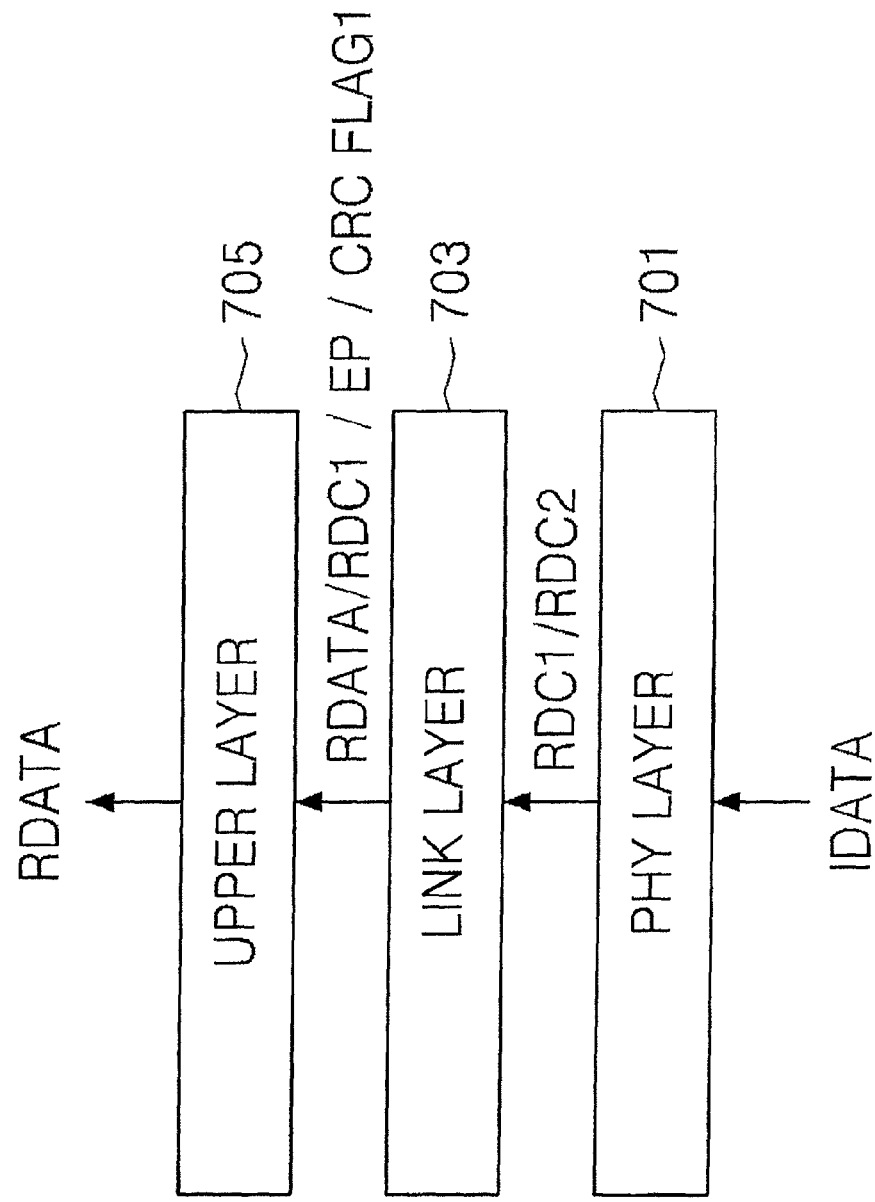
FIG. 8 is a diagram for illustrating an embodiment of the data recovery method in terms of data layers.

FIG. 7 is a flow diagram of a data recovery method performed in an interface according to some embodiments of the inventive concepts. FIG. 8 is a diagram for illustrating an embodiment of the data recovery method in terms of data layers;

For the sake of convenience, in the description, it is assumed that the sampling circuit 40 and the recovery data generation circuit 50 are implemented in a physical (PHY) layer 701 and the recovery circuit 60 is implemented in a link layer 703.

Referring to FIGS. 1 through 5, 7, and 8, the sampling circuit 40 in the PHY layer 701 samples the data IDATA using a plurality of the sampling clock signals JC, QC, and KC, having different phases relative to one another, and outputs a plurality of the sampled data DJi, DQi, and DKi in operation S61.

The recovery data generation circuit 50 in the PHY layer 701 performs a logic operation on the sampled data DJi, DQi, and DKi and generates a plurality of intermediate recovery data, e.g., the first intermediate recovery data RDC1 and the second intermediate recovery data RDC2, according to a result of the logic operation in operation S63. The first intermediate recovery data RDC1 and the second intermediate recovery data RDC2 are transmitted to the recovery circuit 60A in the link layer 703.

The recovery circuit 60, 60A, 60B in the link layer 703 checks for an error, for example, performs CRC on the first intermediate recovery data RDC1 and the second intermediate recovery data RDC2 in operation S65. According to a result of the CRC operation, the recovery circuit 60 or 60A in the link layer 703 outputs either of the first and second intermediate recovery data RDC1 and RDC2 as the recovery data RDATA that is absent of errors in operation S67. At this time, the upper layer 705 may bypass the transmission of the recovery data RDATA.

FIG. 9 is a flow diagram of a data recovery method performed in an interface according to other example embodiments of the inventive concepts. Referring to FIGS. 1 through 4, 6, 8, and 9, the sampling circuit 40 in the PHY layer 701 samples the data IDATA using a plurality of the sampling clock signals JC, QC, and KC having different phases relative to one another and outputs a plurality of the sampled data DJi, DQi, and DKi in operation S71.

The recovery data generation circuit 50 in the PHY layer 701 performs a logic operation on the sampled data DJi, DQi, and DKi and generates a plurality of intermediate recovery data, e.g., the first intermediate recovery data RDC1 and the second intermediate recovery data RDC2, according to a result of the logic operation in operation S73. The first intermediate recovery data RDC1 and the second intermediate recovery data RDC2 are transmitted to the recovery circuit 60B in the link layer 703.

The CRC check unit 71 or 73 in the recovery circuit 60B checks for an error, for example, performs a CRC operation on the first intermediate recovery data RDC1 and the second intermediate recovery data RDC2 in operation S75.

At this time, the CRC check unit 71 or 73 may check the first intermediate recovery data RDC1 and the second intermediate recovery data RDC2 for errors and may generate the CRC flag CRCFLAG1 or CRCFLAG2 in accordance with a result of the check operation.

The extraction unit 75 in the recovery circuit 60 compares the first intermediate recovery data RDC1 with the second intermediate recovery data RDC2 and extracts the error position EP in the first intermediate recovery data RDC1 according to a comparison result in operation S77. In response, the extraction unit 75 in the recovery circuit 60 may transmit the first intermediate recovery data RDC1, the error position EP, and/or the first CRC flag CRCFLAG1 to the error correction unit 77 or the upper layer 705.

When the error correction unit 77 in the recovery circuit 60 receives the first intermediate recovery data RDC1, the error position EP, and/or the first CRC flag CRCFLAG1 from the extraction unit 75, the error correction unit 77 may correct an error in the first intermediate recovery data RDC1 using the first intermediate recovery data RDC1, the error position EP, and/or the first CRC flag CRCFLAG1 and transmit the error-corrected recovery data RDATA to the upper layer 705 in operation S79.

When the upper layer 705 receives the first intermediate recovery data RDC1, the error position EP, and/or the first CRC flag CRCFLAG1 from the extraction unit 75, the upper layer 705 may correct an error in the first intermediate recovery data RDC1 using the first intermediate recovery data RDC1, the error position EP, and/or the first CRC flag CRCFLAG1 and may output the error-corrected recovery data RDATA in operation S79.

FIG. 10 is a schematic block diagram of a semiconductor system 800 including the interface 10 illustrated in FIG. 1, in accordance with the present inventive concepts. Referring to FIGS. 1 and 10, the semiconductor system 800 includes a host 810 and a solid state drive (SSD) 820. The host 810 controls data processing operations, e.g., a write operation and a read operation, of the SSD 820.

The SSD 820 includes a data storage unit 830 and a controller 840.

The data storage unit 830 is a data storage medium of the SSD 820 and includes a plurality of non-volatile memory devices 830-1 through 830-N, where N is a natural number.

The data storage unit 830 may be implemented by a non-volatile memory such as a NAND flash memory. One or more (e.g., N) channels CH0 through CH(N−1) may be provided between the data storage unit 830 and the controller 840. The NAND flash memories 830-1 through 830-N may be respectively connected to the channels CH0 through CH(N−1).

The controller 840 includes the interface 10 described above with reference to FIGS. 1 through 5. The recovery data RDATA, which does not have errors and is output from the interface 10, may be stored in one of the non-volatile memory devices 830-1 through 830-N through a corresponding one of the channels CH0 through CH(N−1).

The host 810 may communicate data with the data storage unit 830 through the controller 840.

As described above, according to some embodiments of the inventive concepts, a data recovery circuit performs an XOR operation on a plurality of sampled data generated by sampling data using a plurality of sampling clock signals having different phases relative to one another, checks a plurality of intermediate recovery data generated according to a result of the XOR operation for errors, and outputs intermediate recovery data without errors among the plurality of intermediate recovery data as recovery data. Since the intermediate recovery data without errors is output among the plurality of intermediate recovery data as the recovery data, the bit error rate of the recovery data is reduced.

While the present inventive concepts have been particularly shown and described with reference to exemplary embodiments thereof, it will be understood that various changes in forms and details may be made therein without departing from the spirit and scope of inventive concepts as defined by the following claims.

What is claimed is:

1. A data recovery circuit comprising:
   a sampling circuit configured to sample data using a plurality of sampling clock signals having different phases relative to one another and to output a plurality of sampled data;
   a recovery data generation circuit configured to determine whether logic levels of the plurality of sampled data are the same and generate a plurality of intermediate recovery data according to a result of the determination; and
   a recovery circuit configured to check the plurality of intermediate recovery data for existence of an error and to output intermediate recovery data that is error-free, among the plurality of intermediate recovery data, as recovery data,
   wherein the recovery data generation circuit includes:
      a logic gate circuit configured to determine whether logic levels of the plurality of sampled data are the same and to output a decision signal according to a result of the determination; and
      a data generation circuit configured to generate the plurality of intermediate recovery data, the plurality of intermediate recovery data respectively having the same or different logic levels based on a logic level of one of the plurality of sampled data in response to the decision signal.

2. The data recovery circuit of claim 1, wherein the logic gate circuit outputs the decision signal having a first level when the logic levels of the plurality of sampled data are all the same, and wherein the data generation circuit generates the plurality of intermediate recovery data having the same logic levels in response to the decision signal having the first level.

3. The data recovery circuit of claim 2, wherein the logic gate circuit outputs the decision signal having a second level when the logic levels of the plurality of sampled data are not all the same, and wherein the data generation circuit generates the plurality of intermediate recovery data having the different logic levels in response to the decision signal having the second level.

4. The data recovery circuit of claim 1, wherein the logic gate circuit includes:
   a plurality of XOR gates each configured to receive at least two sampled data among the plurality of sampled data; and
   an OR gate configured to perform an OR operation on output signals of the respective XOR gates and to output the decision signal.

5. The data recovery circuit of claim 1, wherein the recovery circuit includes:
   a plurality of cyclic redundancy check (CRC) checkers each configured to perform CRC in order to check each of the plurality of intermediate recovery data for existence of an error and to output a detection signal indicating existence or non-existence of an error;
   a plurality of frame buffers configured to respectively store each of the plurality of intermediate recovery data;
   a selection signal generator configured to output a selection signal in response to the detection signal output from each of the CRC checkers; and
   a multiplexer configured to output data from one of the frame buffers as the recovery data in response to the selection signal.

6. The data recovery circuit of claim 1, wherein the recovery circuit includes:
   a plurality of cyclic redundancy check (CRC) check units each configured to perform CRC in order to check each of the plurality of intermediate recovery data for existence of an error;
   an extraction unit configured to compare first intermediate recovery data, which is output from one of the CRC check units and in which an error is present, with second intermediate recovery data, which is output from another one of the CRC check units and in which an error is not present, to extract an error position, and to output the first intermediate recovery data and the error position; and
   an error correction unit configured to correct an error in the first intermediate recovery data based on the error position and to output the recovery data.

7. The data recovery circuit of claim 1, wherein the sampling circuit and the recovery data generation circuit are implemented in a physical layer and the recovery circuit is implemented in a link layer.

8. An operation method of a data recovery circuit, the operation method comprising:
   sampling data using a plurality of sampling clock signals having different phases relative to one another and outputting a plurality of sampled data;
   determining whether logic levels of the plurality of sampled data are the same and generating a plurality of intermediate recovery data according to a result of the determination; and
   checking the plurality of intermediate recovery data for an error and outputting intermediate recovery data that is error-free among the plurality of intermediate recovery data as recovery data,
   wherein the generating the plurality of intermediate recovery data comprises:
      generating the plurality of intermediate recovery data having same logic levels when logic levels of the plurality of sampled data are the same; and generating the plurality of intermediate data having different logic levels relative to each another when the logic levels of the plurality of sampled data are not the same.

9. The operation method of claim 8, wherein the outputting the intermediate recovery data as the recovery data comprises:
performing cyclic redundancy check (CRC) to check each of the plurality of intermediate recovery data for existence of an error and outputting a detection signal indicating existence or non-existence of an error; and
outputting data from one of frame buffers, which respectively store each of the plurality of intermediate recovery data, as the recovery data in response to the detection signals.

10. The operation method of claim 8, wherein the outputting the intermediate recovery data as the recovery data comprises:
performing cyclic redundancy check (CRC) to check each of the plurality of intermediate recovery data for existence of an error using a plurality of CRC check units;
comparing first intermediate recovery data, which is output from one of the CRC check units and in which an error is present, with second intermediate recovery data, which is output from another one of the CRC check units and in which an error is not present, extracting an error position, and outputting the first intermediate recovery data and the error position; and
correcting an error in the first intermediate recovery data based on the error position and outputting the recovery data.

11. The operation method of claim 8, wherein the operation method is performed in a system comprising a serial advanced technology attachment (SATA) interface.

12. The operation method of claim 8, wherein the operation method is performed in a system using a peripheral component interconnect express (PCIe) standard.

13. A data recovery circuit comprising:
a sampling circuit that samples input data with a plurality of sampling clock signals, the sampling clock signals having different phases relative to each other, the sampling circuit outputting a plurality of sampled data;
a recovery data generation circuit that receives the plurality of sampled data and that generates first and second intermediate recovery data based on logic levels of the plurality of sampled data, the first and second intermediate recovery data having the same logic level when the plurality of sampled data all have the same logic levels, and the first and second intermediate recovery data having different logic levels when the plurality of sampled data do not all have the same logic levels; and
a recovery circuit that generates recovery data that is error-free in response to the first and second intermediate recovery data.

14. The data recovery circuit of claim 13 wherein the recovery data generation circuit includes an XOR logic operation circuit that performs on XOR operation on the plurality of sampled data to determine whether the plurality of sampled data all have the same logic levels.

15. The data recovery circuit of claim 13 wherein the recovery circuit includes:
first and second cyclic redundancy check (CRC) checkers, each configured to perform CRC in order to check each of the corresponding first and second intermediate recovery data for existence of an error and to output a detection signal indicating existence or non-existence of an error;
first and second frame buffers configured to respectively store each of the first and second intermediate recovery data;
a selection signal generator configured to output a selection signal in response to the detection signal output from each of the first and second CRC checkers; and
a multiplexer configured to output data from one of the first and second frame buffers as the recovery data in response to the selection signal.

16. The data recovery circuit of claim 13, wherein the recovery circuit includes:
first and second cyclic redundancy check (CRC) check units, each configured to perform CRC in order to check each of the corresponding first and second intermediate recovery data for existence of an error;
an extraction unit configured to compare first intermediate recovery data, which is output from the first CRC check unit and in which an error is present, with second intermediate recovery data, which is output from the second CRC check unit and in which an error is not present, to extract an error position in the first and second intermediate recovery data for existence of an error, and to output the first intermediate recovery data and the error position; and
an error correction unit configured to correct an error in the first intermediate recovery data based on the error position and to output the recovery data.

17. The data recovery circuit of claim 13, wherein the recovery circuit compares a logic level of the first and second intermediate recovery data, and generates the recovery data in response to the comparison.

18. The data recovery circuit of claim 17, wherein the recovery circuit further determines an error position in the first and second intermediate recovery data, and generates the recovery data in response to the error position.

* * * * *